(12) United States Patent
Takagimoto et al.

(10) Patent No.: US 12,356,525 B2
(45) Date of Patent: Jul. 8, 2025

(54) SEMICONDUCTOR INTEGRATED CIRCUIT FOR DRIVING LIGHT EMITTING ELEMENT, LIGHT EMITTING ELEMENT DRIVING DEVICE, LIGHT EMITTING DEVICE, AND VEHICLE

(71) Applicant: Rohm Co., Ltd., Kyoto (JP)

(72) Inventors: Shinsuke Takagimoto, Kyoto (JP); Akira Aoki, Kyoto (JP); Junichi Hagino, Kyoto (JP)

(73) Assignee: Rohm Co., Ltd.

( * ) Notice: Subject to any disclaimer, the term of this patent is extended or adjusted under 35 U.S.C. 154(b) by 144 days.

(21) Appl. No.: 18/026,902

(22) PCT Filed: Oct. 12, 2021

(86) PCT No.: PCT/JP2021/037651
§ 371 (c)(1),
(2) Date: Mar. 17, 2023

(87) PCT Pub. No.: WO2022/097430
PCT Pub. Date: May 12, 2022

(65) Prior Publication Data
US 2023/0337346 A1    Oct. 19, 2023

(30) Foreign Application Priority Data
Nov. 9, 2020    (JP) .................... 2020-186255

(51) Int. Cl.
*H05B 45/54*    (2020.01)
*B60Q 1/14*    (2006.01)
(Continued)

(52) U.S. Cl.
CPC ............ *H05B 45/54* (2020.01); *H05B 45/44* (2020.01); *H05B 47/16* (2020.01); *B60Q 1/14* (2013.01); *B60Q 1/30* (2013.01); *B60Q 1/32* (2013.01)

(58) Field of Classification Search
CPC ...... H05B 45/54; H05B 45/44; H05B 45/347; H05B 45/38; H05B 45/48; H05B 47/44;
(Continued)

(56) References Cited

U.S. PATENT DOCUMENTS 10,362,649 B2 *   7/2019   Gong ..................... H05B 45/48
11,375,592 B2 *   6/2022   Huang .................... F21V 9/08
(Continued)

FOREIGN PATENT DOCUMENTS

JP    2011233260    11/2011
JP    2013047047    3/2013
(Continued)

OTHER PUBLICATIONS

International Search Report for PCT/JP2021/037651 dated Nov. 22, 2021 with English translation (5 pages).
(Continued)

*Primary Examiner* — Raymond R Chai
(74) *Attorney, Agent, or Firm* — Fish & Richardson P.C.

(57) ABSTRACT

A semiconductor integrated circuit for driving a light emitting element forms at least part of a light emitting element driving device configured to change the number of light emitting elements that are lit among a plurality of light emitting elements connected in series. The semiconductor integrated circuit includes a variable resistor controller configured to increase the resistance value of a variable resistor connected in series with the plurality of light emitting elements immediately before, or at the same time as, the time point at which the number of light emitting elements that are lit is reduced.

10 Claims, 8 Drawing Sheets

(51) Int. Cl.
*B60Q 1/30* (2006.01)
*B60Q 1/32* (2006.01)
*H05B 45/44* (2020.01)
*H05B 47/16* (2020.01)

(58) Field of Classification Search
CPC . H05B 47/16; B60Q 1/14; B60Q 1/30; B60Q 1/32; Y02B 20/40
See application file for complete search history.

(56) References Cited

U.S. PATENT DOCUMENTS

| | | | |
|---|---|---|---|
| 2014/0265890 A1* | 9/2014 | Ito | B60Q 1/00 |
| | | | 315/186 |
| 2019/0327801 A1* | 10/2019 | Cheng | H05B 45/48 |
| 2021/0160989 A1* | 5/2021 | Ichikawa | H05B 45/325 |
| 2021/0168917 A1* | 6/2021 | Jiang | H05B 45/30 |
| 2024/0334564 A1* | 10/2024 | Robinson | H05B 45/10 |

FOREIGN PATENT DOCUMENTS

| | | |
|---|---|---|
| JP | 2015063252 | 4/2015 |
| JP | 2020009637 | 1/2020 |

OTHER PUBLICATIONS

JP OA—Japanese Patent Office, Office Action in Japanese Appln. No. 2022-560688, dated May 7, 2025, 6 pages (with machine translation).

* cited by examiner

SEMICONDUCTOR INTEGRATED CIRCUIT FOR DRIVING LIGHT EMITTING ELEMENT, LIGHT EMITTING ELEMENT DRIVING DEVICE, LIGHT EMITTING DEVICE, AND VEHICLE

CROSS REFERENCE TO RELATED APPLICATIONS

This application is a U.S. National Phase application under 35 U.S.C. § 371 of International Patent Application No. PCT/JP2021/037651, filed on Oct. 12, 2021, which claims the priority of Japanese Patent Application No. 2020-186255, filed on Nov. 9, 2020, the disclosure of which is incorporated herein by reference in its entirety.

TECHNICAL FIELD

The invention disclosed herein relates to a semiconductor integrated circuit for driving a light emitting element. The invention disclosed herein also relates to a light emitting element driving device, and to a light emitting device and a vehicle employing such a light emitting element driving device.

BACKGROUND ART

A headlight of a vehicle is configured to be able to switch between a state in which it serves as a passing headlight by emitting a low beam and a state in which it serves as a cruising headlight by emitting a high beam that reaches farther frontward than the low beam.

One example of a light emitting device used as a headlight for a vehicle is disclosed in Patent Document 1. The light emitting device (LED lighting circuit) disclosed in Patent Document 1 has a plurality of light emitting elements connected in series and is configured to, in the state serving as a cruising headlight, light all the light emitting elements and, in the state serving as a passing headlight, short-circuit part of the light emitting elements to light only the rest of the light emitting elements.

LIST OF CITATIONS

Patent Literature

Patent Document 1: JP-A-2.013-47047 (Paragraphs 0029 to 0033)

SUMMARY OF THE INVENTION

Problem to be Solved by the Invention

In the light emitting device (LED lighting circuit) disclosed in Patent Document 1, when switching takes place from the state serving as a cruising headlight to the state serving as a passing headlight, the output voltage of the DC-DC converter for driving a light emitting element drops. The drop in the output voltage causes the electric charge stored in the output capacitor in the DC-DC converter to be discharged from the output capacitor. This momentarily causes an overcurrent in the output current of the DC-DC converter, and the overcurrent momentarily passes through the LEDs that are not short-circuited. That is, when switching takes place from the state serving as a cruising headlight to the state serving as a passing headlight, the LEDs that are not short-circuited are damaged.

In Patent Document 1, when switching is performed from a state of a high beam for traveling to a state of a low beam for an oncoming car, the LEDs are short-circuited in two steps so that the output voltage of the DC-DC converter drops in two steps so as to reduce the overcurrent.

However, the light emitting device (LED lighting circuit) disclosed in Patent Document 1 merely reduces the magnitude of an overcurrent and provides no fundamental solution to an overcurrent. Thus, the value of a predetermined output voltage Va resulting from the first-state drop in the output voltage and the value of a retention time t1 for which to maintain the predetermined output voltage Va needs to be optimized experimentally by cut-and-try method so that an overcurrent can be reliably reduced to a desired value. The optimum values of Va and t1 mentioned above vary with changes in the specifications of LED or variations among individual LEDs; thus, with the light emitting device (LED lighting circuit) disclosed in Patent Document 1, it is difficult to guarantee that the overcurrent is reduced to a desired value.

Other than switching from a high beam to a low beam as described above, controlling a lamp on a vehicle may involve, for example, control for lighting a plurality of light emitting elements sequentially, control for distinguishing a plurality of light emitting elements sequentially, control for lighting a plurality of light emitting elements arranged in a matrix to display an animation, control for lighting a plurality of light emitting elements as an ADB (adaptive driving beam), and the like, and any such control may cause a high current to pass through light emitting elements due to a decreased number of light emitting elements that are lit.

Means for Solving the Problem

According to one aspect of what is disclosed herein, a semiconductor integrated circuit for driving a light emitting element forms at least part of a light emitting element driving device configured to change the number of light emitting elements that are lit among a plurality of light emitting elements connected in series. The semiconductor integrated circuit includes a variable resistor controller configured to increase the resistance value of a variable resistor connected in series with the plurality of light emitting elements immediately before, or at the same time as, the time point at which the number of light emitting elements that are lit is reduced.

According to another aspect of what is disclosed herein, a light emitting element driving device includes an adjuster configured to change the number of light emitting elements that are lit among a plurality of light emitting elements connected in series and a variable resistor controller configured to increase the resistance value of a variable resistor connected in series with the plurality of light emitting elements immediately before, or at the same time as, the time point at which the number of light emitting elements that are lit is reduced.

According to yet another aspect of what is disclosed herein, a light emitting device includes the light emitting element driving device according to the above configuration and the plurality of light emitting elements.

According to still another aspect of what is disclosed herein, a vehicle includes the light emitting device according to the above configuration.

Advantageous Effects of the Invention

With a semiconductor integrated circuit for driving a light emitting element, a light emitting element driving device, a light emitting device, and a vehicle according to what is disclosed herein, it is possible to prevent a high current from passing through light emitting elements when the number of light emitting elements that are lit is decreased.

DESCRIPTION OF EMBODIMENTS

In the present description, a MOS field-effect transistor denotes a field-effect transistor in which the gate is structured to have at least three layers: a layer of an electrical conductor or of a semiconductor such as polysilicon with a low resistance value, an insulation layer, and a P-type, N-type or intrinsic semiconductor layer. That is, the structure of the gate of a MOS field-effect transistor is not limited to a three-layer structure composed of a metal, an oxide, and a semiconductor.

<Light Emitting Device>

Figure 1:
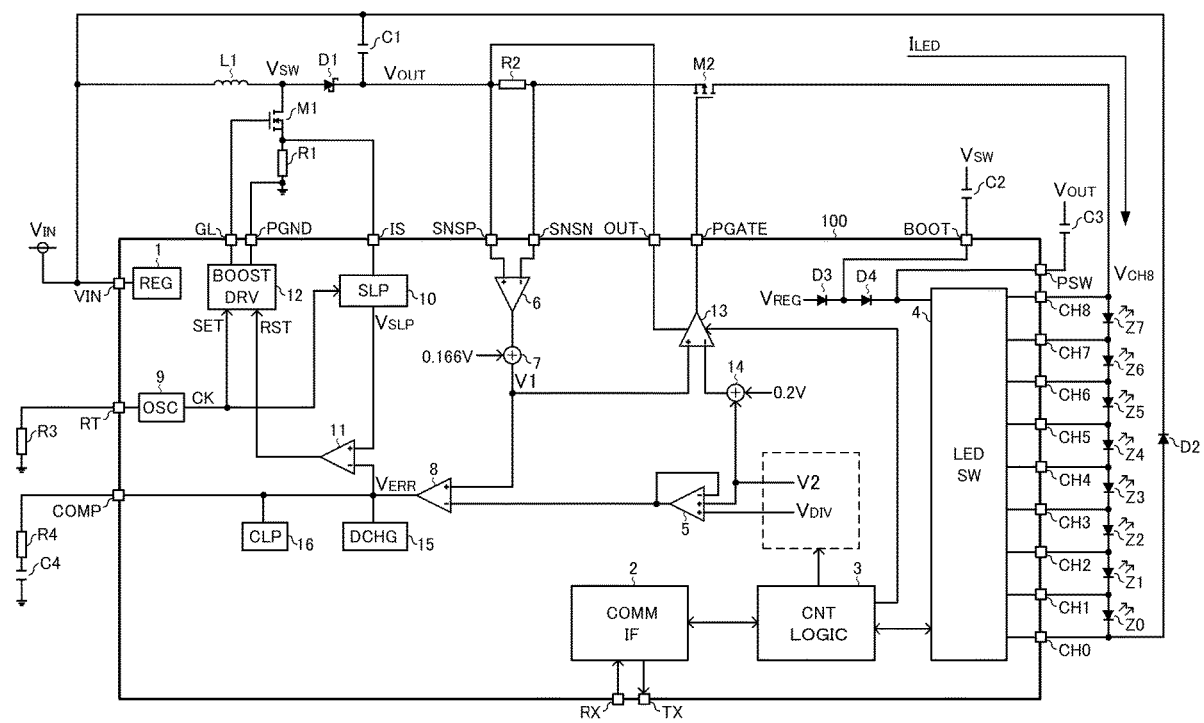
FIG. 1 is a diagram showing one configuration example of a light emitting device.

FIG. 1 is a diagram showing one configuration example of a light emitting device. The light emitting device shown in FIG. 1 includes a light emitting element driving IC 100. The light emitting device shown in FIG. 1 includes light emitting diodes Z0 to Z7 as light emitting elements and a light emitting element driving device for driving the light emitting elements. The light emitting element driving device includes the light emitting element driving IC 100.

The light emitting device shown in FIG. 1 includes a coil L1, an N-channel MOS field-effect transistor (hereinafter called an NMOS transistor) M1 as a switching element, a Schottky barrier diode D1, and an output capacitor C1.

The coil L1, the NMOS transistor M1, the Schottky barrier diode D1, and the output capacitor C1 constitute a DC-DC converter of a boost/buck (step-up/-down) type. The DC-DC converter converts a direct-current input voltage V1 to a direct-current output voltage $V_{OUT}$.

The light emitting device shown in FIG. 1 includes sense resistors R1 and R2, a P-channel MOS field-effect transistor (hereinafter referred to as a PMOS transistor) M2 as a variable resistor, light emitting diodes Z0 to Z7, a diode D2, capacitors C2 to C4, and resistors R3 to R4.

The light emitting element driving IC 100 is a semiconductor integrated circuit device (what is called an LED driver IC) having integrated in it a constant voltage circuit 1, a communication interface 2, a control logic circuit 3, an LED (light emitting diode) switching circuit 4, operational amplifiers 5 and 6, an adder 7, an error amplifier 8, an oscillator 9, a slope circuit 10, a comparator 11, a boosting drive circuit 12, an operational amplifier 13, an adder 14, a discharge circuit 15, a clamping element 16, and diodes D3 and D4. The light emitting element driving IC 100 further has, for establishing electrical connection with the outside, a terminal YIN, a terminal GE, a terminal POND, a terminal IS, a terminal SNSP, a terminal SNSN, a terminal PGATE, a terminal BOOT, a terminal PSW, terminals CH8 to CH0, a terminal TX, a terminal RX, a terminal COMP, and a terminal RT.

The input voltage $V_{IN}$ is connected to the terminal VIN, to one terminal of the coil L1, to one terminal of the output capacitor C1, and to the cathode of the diode D2. The other terminal of the coil L1 is connected to the drain of the NMOS transistor M1 and to the anode of the Schottky barrier diode D1. The source of the NMOS transistor M1 is connected to one terminal of the sense resistor R1 and to the terminal IS. The other terminal of the sense resistor R1 is connected to a ground potential and to the terminal PGND. The gate of the NMOS transistor M1 is connected to the terminal GL. Through the switching operation by the NMOS transistor M1, a switching voltage $V_{SW}$ with a rectangular waveform appears at the other end of the coil L1. The switching voltage $V_{SW}$ is fed to one terminal of the capacitor C2. The other terminal of the capacitor C2 is connected to the terminal BOOT.

The cathode of the Schottky barrier diode D1 is connected to the other terminal of the output capacitor C1, to one terminal of the sense resistor R2, to the terminal SNSP, and to the terminal OUT. At the other end of the output capacitor C1, the output voltage $V_{OUT}$ appears. The output voltage $V_{OUT}$ results from the switching voltage $V_{SW}$ being smoothed. The output voltage $V_{OUT}$ is fed to one terminal of the capacitor C3. The other terminal of the capacitor C3 is connected to the terminal PSW.

The other terminal of the sense resistor R2 is connected to the source of a PMOS transistor M2 and to the terminal SNSN. The gate of the PMOS transistor M2 is connected to the terminal PGATE. The drain of the PMOS transistor M2 is connected to the terminal CH8. An LED drive current LED passes through the sense resistor R2 and the PMOS transistor M2 and is fed to, of the light emitting diode Z0 to Z8, the ones that are lit.

The anode of the light emitting diode Zm is connected to the terminal CH(m+1), and the cathode of the light emitting diode Zm is connected to the terminal CHm. Here, m is any integer of zero or more but seven or less. The anode of the diode D2 is connected to the terminal CH0. When the terminal CH0 is short-circuited to ground, the terminals VIN and GND are short-circuited together, and a high current passes from the terminal VIN. When at least one of the terminals CH1 to CH7 is short-circuited to ground, the diode D2 prevents a current to pass via a parasitic diode in a switch within the LED switching circuit 4. The diode D2 can be, for example, a Schottky barrier diode.

One terminal of the resistor R3 for setting a clock frequency is connected to the terminal RT. The other terminal of the resistor R3 is connected to the ground potential.

One terminal of the resistor R4 is connected to the terminal COMP. The other terminal of the resistor R4 is connected to the ground potential via the capacitor C4 for phase compensation.

The constant voltage circuit 1 generates a constant voltage $V_{REG}$ using the input voltage $V_{IN}$ fed in via the terminal $V_{IN}$ and feeds the constant voltage $V_{REG}$ to different circuit blocks in the light emitting element driving IC 100.

The communication interface 2 receives a signal fed in from the outside via the terminal RX and transmits the signal output from the control logic circuit 3 to the outside via the terminal TX. The communication interface can be, for example, a UART (universal asynchronous receiver-transmitter) interface. The signal that the communication interface 2 receives can be, for example, an instruction signal that indicates the lighting states of the light emitting diodes Z0 to Z7. The signal that the communication interface 2 transmits can be, for example, a fault indication signal that indicates a fault.

The control logic circuit 3 controls the LED switching circuit 4 based on the signal received by the communication interface 2. The control logic circuit 3 sets the voltage division ratio of a division voltage $V_{DIV}$ obtained by dividing the input voltage $V_{IN}$ and the value of a second voltage V2 corresponding to a target current. What is called DC dimming is achieved by changing the value of the second voltage V2.

Under the control of the control logic circuit 3, the LED switching circuit 4 selects, of the light emitting diodes 70 to Z7, the ones that are to be lit. That is, the control logic circuit 3 and the LED switching circuit 4 change the number of light emitting diodes Z0 to Z7 that are lit. The LED switching circuit 4 turns off the switches connected in parallel with the light emitting diodes that are to be lit and turns on the switches connected in parallel with the light emitting diodes that are to be extinguished. The LED switching circuit 4 uses as a supply voltage the voltage fed in via the terminal PSW. The cathode of the diode D4 is connected to the terminal PSW, the anode of the diode D4 and the cathode of the diode D3 are connected to the terminal BOOT, and the constant voltage $V_{REG}$ is fed to the anode of the diode D3.

The operational amplifier 5 outputs the lower of the division voltage $V_{DIV}$ and the second voltage V2. In this way, when the division voltage $V_{DIV}$ is lower than the second voltage V2, it is possible to lower the LED current $_{ILED}$ in accordance with the fall in the input voltage $V_{IN}$. The output voltage of the operational amplifier 5 is fed to the inverting input terminal of the error amplifier 8.

The non-inverting input terminal of the operational amplifier 6 is connected to the terminal SNSP, and the inverting input terminal of the operational amplifier 6 is connected to the terminal SNSN. The operational amplifier 6 outputs a voltage in accordance with the voltage across the sense resistor R2.

The output voltage of the operational amplifier 6 is offset by the adder 7 to be 0.166 V higher. The first voltage V1 generated by the adder 7 is fed to the non-inverting input terminal of the error amplifier 8 and to the non-inverting input terminal of the operational amplifier 13. The first voltage V1 is a voltage based on the output current of the DC-DC converter described above, that is, the LED current $I_{LED}$.

The error amplifier 3 generates an error voltage $V_{ERR}$ in accordance with the difference between the first voltage V1 and the output voltage of the operational amplifier 5.

The oscillator 9 generates a clock signal CK. The clock frequency of the clock signal CK is determined by the resistance value of the resistor R3 connected to the terminal RT. The clock signal CK is fed to the slope circuit 10 and to the boosting drive circuit 12.

The slope circuit 10 generates a slope voltage $V_{SLP}$ with a triangular or sawtooth-shaped waveform using the clock signal CK. The gradient of the slope voltage $V_{SLP}$ varies in accordance with the voltage fed to the terminal IS, that is, the source voltage of the NMOS transistor M1.

The comparator 11 compares the error voltage $V_{ERR}$ with slope voltage $V_{SLP}$ and feeds the comparison result to the boosting drive circuit 12.

Based on the clock signal CK and the output from the comparator 11, the boosting drive circuit 12 generates a gate signal for the NMOS transistor and feeds it to the gate of the NMOS transistor M1 via the terminal GL.

With the circuit configuration described above, unless the division voltage $V_{DIV}$ is lower than the second voltage V2, the DC-DC converter described above is subjected to feedback control such that the LED current LED is kept close to the target current.

According to an instruction from the control logic circuit 3, immediately before a time point at which the number of light emitting diodes Z0 to Z7 that are lit is reduced, the operational amplifier 13 increases the resistance value of the PMOS transistor M2 connected in series with the light emitting diodes Z0 to Z7. The operational amplifier 13 uses as a supply voltage the output voltage $V_{OUT}$ fed to the terminal OUT.

Grasping in advance how to control the lighting states of the light emitting diodes Z0 to Z7, the control logic circuit 3 can, immediately before a time point at which the number of light emitting diodes Z0 to Z7 that are lit is reduced, instruct the operational amplifier 13 to increase the resistance value of the PMOS transistor M2.

By increasing the resistance value of the PMOS transistor M2, it is possible to suppress an increase in the LED current $I_{LED}$ on the occasion of a reduction in the number of light emitting diodes Z0 to Z7 that are lit.

The light emitting element driving IC 100 is configured not so as to sense an increase in the LED current LED and increase the resistance value of the PMOS transistor M2 based on the sensing result, but so as to increase the resistance value of the PMOS transistor M2 before the LED current $I_{LED}$ increases. Thus, the light emitting element driving IC 100 can increase the resistance value of the PMOS transistor M2 more promptly than the configuration that senses an increase in the LED current $I_{LED}$ and increases the resistance value of the PMOS transistor M2 based on the sensing result. That is, the light emitting element driving IC 100 can suppress an increase in the LED current LED more effectively than the configuration that senses an increase in the LED current km and increases the resistance value of the PMOS transistor M2 based on the sensing result.

Figure 2:
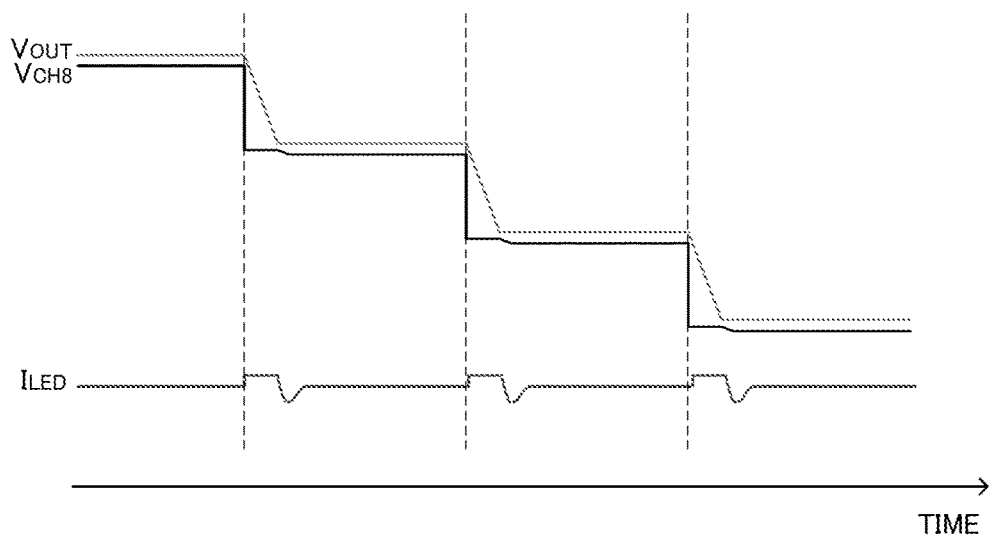
FIG. 2 is a timing chart showing the waveforms of the output voltage of a DC-DC converter, the voltage fed to light emitting diodes, and the LED current.

FIG. 2 is a timing chart showing the waveforms of the output voltage $V_{OUT}$ of the DC-DC converter, the voltage $V_{CH8}$ fed to the light emitting diode Z7, and the LED current $I_{LED}$. FIG. 2 is a timing chart observed as the number of light emitting diodes Z0 to Z7 that are lit is decreased one by one. The broken lines in FIG. 2 show time points at which the control logic circuit 3 decreases the number of light emitting diodes Z0 to Z7 that are lit.

Starting at a time point at which the control logic circuit 3 decreases the number of light emitting diodes Z0 to Z7 that are lit, a period is observed in which the difference between the output voltage $V_{OUT}$ and the voltage $V_{CH8}$ is larger. However, since the resistance value of the PMOS transistor M2 is increased in advance, the PMOS transistor M2 limits the LED current $I_{LED}$; this suppresses an increase in the LED current $I_{LED}$ during the period with the large difference between the output voltage $V_{OUT}$ and the voltage $V_{CH8}$.

In the embodiment, the operational amplifier 13 keeps the resistance value of the PMOS transistor M2 increased during a period from 10 μs before the time point at which the number of light emitting diodes Z0 to Z7 that are lit is decreased up to several tens of microseconds after the time point at which the number of light emitting diodes Z0 to Z7 that are lit is decreased compared to in any other periods (during steady operation). How much to increase the resistance value of the PMOS transistor M2 is determined based on the period during which the output voltage $V_{OUT}$ is decreasing (the slew rate). For example, the resistance value of the PMOS transistor M2 may be kept increased until the PMOS transistor M2 momentarily turns off or within a range where the PMOS transistor M2 stays on. During steady operation, the operational amplifier 13 keeps the PMOS transistor M2 fully on so as to minimize the power loss in the PMOS transistor M2.

The length of time immediately before the time point at which the number of light emitting diodes Z0 to Z7 that are lit is reduced is not limited to 10 μs; instead, it can be set, for example, within a range between 1 μs to 100 μs. The resistance value of the PMOS transistor M2 may be increased, instead of immediately before the time point at which the number of light emitting diodes Z0 to Z7 that are lit is reduced, at the same time as the time point at which the number of light emitting diodes Z0 to Z7 that are lit is reduced Although the length of time immediately after the time point at which the light emitting diodes Z0 to Z7 that are lit is reduced is not limited to 10 Its, it is preferable to set it, for example, within a range between 1 to 100 pts. The set periods immediately before and immediately after the time point at which the light emitting diodes Z0 to Z7 that are lit is reduced may be equal as in the embodiment or may be different unlike in the embodiment.

The second voltage V2 is offset by the adder 14 to be 0.2 V higher. The second voltage V2 having been offset by the adder 14 is fed to the inverting input terminal of the operational amplifier 13.

The operational amplifier 13 controls the PMOS transistor M2 in accordance with the difference between the first voltage V1 and the second voltage V2 having been offset by the adder 14. Thus, when the LED current LED is higher than a target current by a predetermined value or more, the operational amplifier 13 can limit the LED current LED by increasing the resistance value of the PMOS transistor M2. The predetermined value mentioned above can be adjusted, for example, by changing the value of the offset voltage (0.2 V in the embodiment) in the adder 14. Moreover, when the LED current is higher than the target current by the predetermined value or more, this fails out of the steady operation mentioned above.

Although, in the embodiment, the adder 14 offsets the second voltage V2, a configuration is also possible where, instead of or in addition to the adder 14 offsetting the second voltage V2, an adder for offsetting the first voltage V1 is provided and the first voltage V1 having been offset is fed to the non-inverting input terminal of the operational amplifier 13. Also in this modified example, when the LED current $I_{LED}$ is higher than a target current by a predetermined value or more, the operational amplifier 13 can limit the LED current LED by increasing the resistance value of the PMOS transistor M2. In this modified example, the predetermined value can be adjusted, for example, by changing the value of the offset voltage applied to the first voltage V1, or, for another example, by changing at least one of the value of the offset voltage applied to the first voltage V1 and the value of the offset voltage applied to the second voltage V2.

The discharge circuit 15 draws a current from the output terminal of the error amplifier 8 when the operational amplifier 13 is keeping the resistance value of the PMOS transistor M2 increased compared to during steady operation. In this way, when the resistance value of the PMOS transistor M2 is increased compared to during steady operation, the error voltage $V_{ERR}$ falls; thus, the boosting drive circuit 12 controls the switching of the NMOS transistor 111 such that the LED current $I_{LED}$ falls. It is possible to suppress the power loss in the PMOS transistor M2 when the resistance value of the PMOS transistor M2 is increased compared to during steady operation.

There is no particular limitation on the value of the current drawn by the discharge circuit 15. For example, the value of the current drawn by the discharge circuit 15 is set based on the control state of the terminal PGATE in this case, the discharge circuit 15 may include a current mirror circuit and draw a mirror current of the current passing through the terminal PGATE from the output terminal of the error amplifier 8. Or, for another example, the discharge circuit 15 may include a constant current circuit and draw a constant current from the output terminal of the error amplifier 8. For yet another example, the discharge circuit 15 may include a variable current circuit and set the value of the output current of the variable current circuit based on the circuit constant of an externally connected discrete component, a signal received by the communication interface 2, or the like so as to draw the output current of the variable current circuit from the output terminal of the error amplifier 8.

The clamping element 16 clamps the lower limit of the error voltage $V_{ERR}$. For the clamping element 16, for example, a Zener diode or the like can be used. If the error voltage $V_{ERR}$ becomes too low as a result of the drawing of the current by the discharge circuit 15, it may lead to an insufficient LED current LED on return to steady operation. Providing the clamping element 16 helps prevent the LED current. LED from becoming insufficient on return to steady operation.

Figure 3:
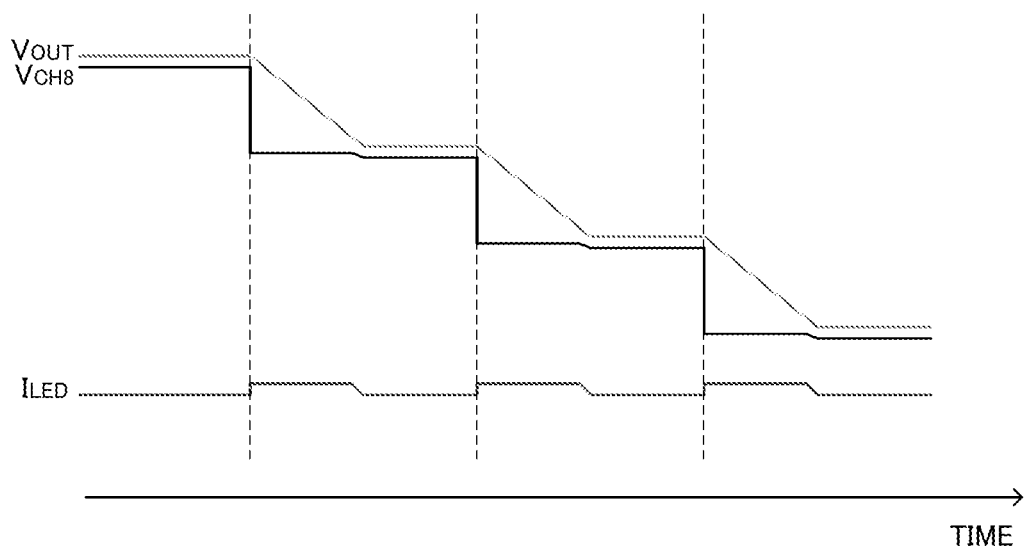
FIG. 3 is a timing chart showing the waveforms, observed with neither a discharge circuit nor a clamping element provided, of the output voltage of the DC-DC converter, the voltage fed to the light emitting diodes, and the LED current.

FIG. 3 is a timing chart showing the waveforms, observed when the discharge circuit 15 and the clamping element 16 are not provided, of the output voltage $V_{OUT}$ of the DC-DC converter, the voltage $V_{CH8}$ fed to the light emitting diode Z7, and the LED current $I_{LED}$. FIG. 3 is, like FIG. 2, a timing chart observed as the number of light emitting diodes Z0 to Z7 that are lit is decreased one by one. The broken lines in FIG. 3, like those in FIG. 2, show time points at which the control logic circuit 3 decreases the number of light emitting diodes Z0 to Z7 that are lit.

In FIG. 3, the period with a large difference between the output voltage $V_{OUT}$ and the voltage $V_{CH8}$ and a large power loss in the PMOS transistor M2 is longer compared to in FIG. 2. Thus, it is preferable to provide the discharge circuit 15 as in the embodiment. It is further preferable to provide the clamping element 16 as in the embodiment so as to prevent the LED current LED from becoming insufficient on return to steady operation.

The control logic circuit 3 can perform PWM (pulse-width modulation) dimming. Specifically, when performing PWM dimming, the control logic circuit 3 generates a PWM signal and, based on the PWM signal, turns on and off the switches connected in parallel with the light emitting diodes that are to be lit. That is, when PWM dimming is performed, the light emitting diodes that are lit are not lit all the time, but whether they are lit or extinguished is switched based on the PWM The control logic circuit 3 sets the duty of the PWM signal based on, for example, a signal received by the communication interface 2.

It is preferable that the control logic circuit 3 and the LED switching circuit 4 have a mode (phase shift triode) in which the timings of switching from lighting to extinction are shifted among the light emitting diodes Z0 to Z7. When all the light emitting diodes Z0 to Z7 are lit in the phase shift mode by PWM dimming, the control logic circuit 3 and the LED switching circuit 4 can light the light emitting diodes Z0 to Z7 as in the timing chart shown in FIG. 4.

Figure 4:
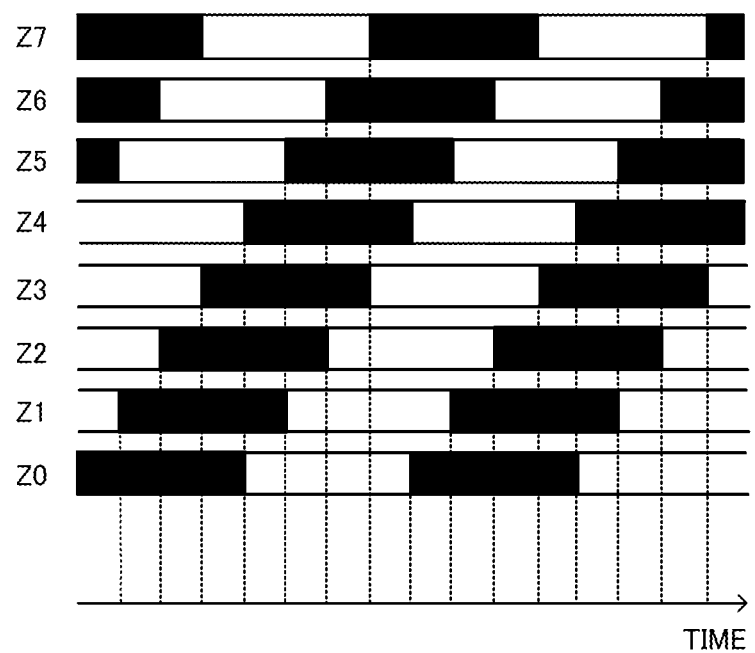
FIG. 4 is a timing chart showing the state of the light emitting diodes.

The broken lines in FIG. 4 show time points at which any of the light emitting diodes Z0 to Z7 switches from lighting to extinction. The solid black parts in FIG. 4 show extinction periods, and the hollow parts in FIG. 4 show the lighting periods.

Figure 5:
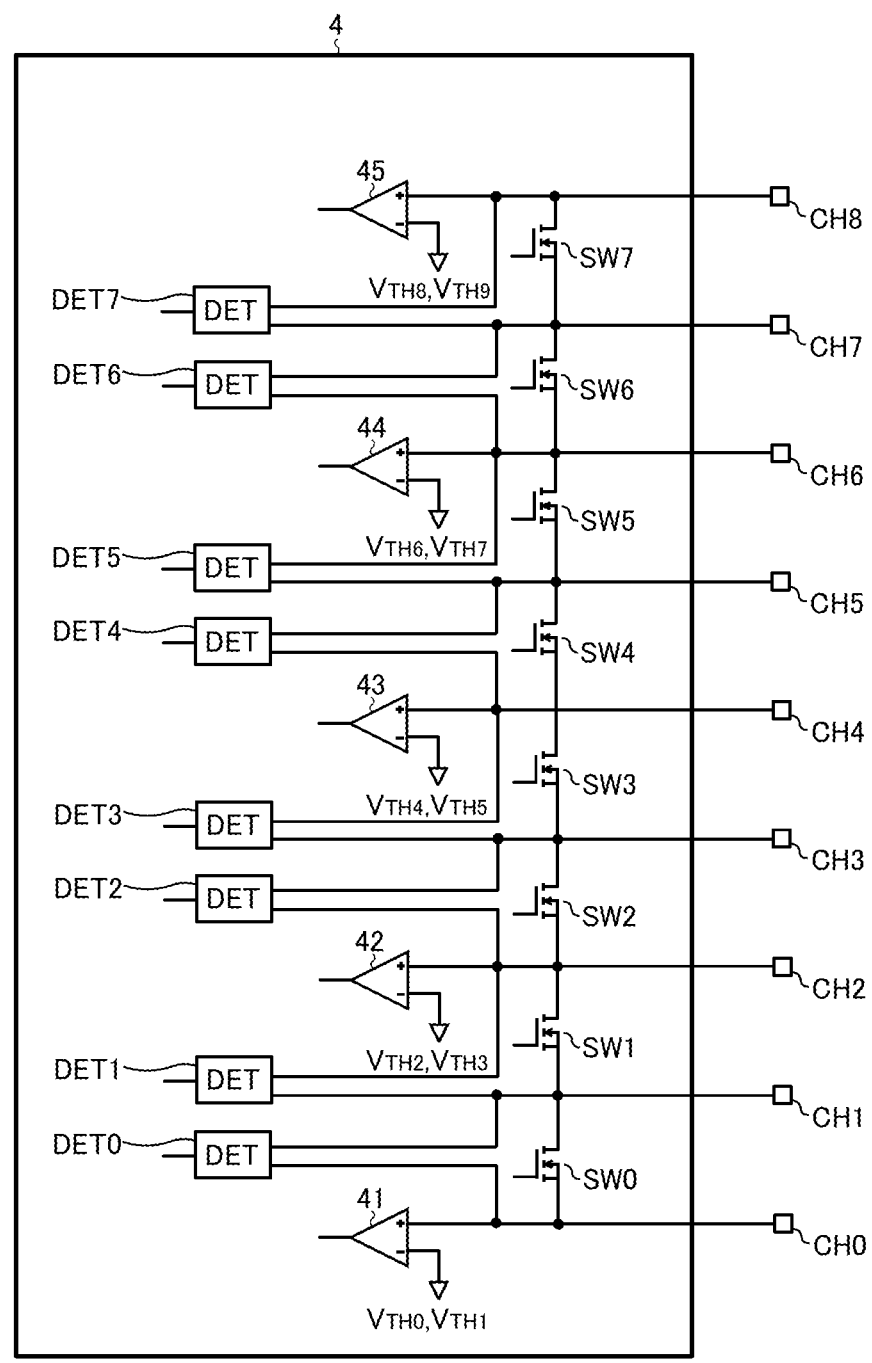
FIG. 5 is a diagram showing one configuration example of an LED switching circuit.

FIG. 5 is a diagram showing one configuration example of the LED switching circuit 4.

The LED switching circuit 4 includes switches SW0 to SW7. The switches SW0 to SW7 are individually turned on and off by the control logic circuit 3. One terminal of the switch SW0 is connected to the terminal CH0. The other terminal of the switch SW0 and one terminal of the switch SW1 are connected to the terminal CH1. The other terminal of the switch SW1 and one terminal of the switch SW2 are connected to the terminal CH2. The other terminal of the switch SW2 and one terminal of the switch SW3 are connected to the terminal CH3. The other terminal of the switch SW3 and one terminal of the switch SW4 are connected to the terminal CH4. The other terminal of the switch SW4 and one terminal of the switch SW5 are connected to the terminal CH5. The other terminal of the switch SW5 and one terminal of the switch SW6 are connected to the terminal CH6. The other terminal of the switch SW6 and one terminal of the switch SW7 are connected to the terminal CH7. The other terminal of the switch SW7 is connected to the terminal CH8.

The LED switching circuit 4 includes a comparator 41 for sensing a ground fault at the terminal CH0. The comparator 41 is a hysteresis comparator and compares a voltage fed to the terminal CH0 with a threshold voltage to output the result of the comparison. If the voltage fed to the terminal CH0 is equal to or higher than the threshold voltage, the output signal of the comparator 41 is at low level (a level indicating a normal state) and, if the voltage fed to the terminal CH0 is lower than the threshold voltage, the output signal of the comparator 41 is at high level (a level indicating a ground fault at the terminal CH0). The threshold voltage used in the comparator 41 shifts between a zeroth threshold voltage $V_{TH0}$ and a first threshold voltage $V_{TH1}$ in accordance with the level of the output signal of the comparator 41. The output signal of the comparator 41 is transmitted to the control logic circuit 3.

The LED switching circuit 4 includes a comparator 42 for sensing a ground fault at the terminal CH2. The comparator 42 is a hysteresis comparator and compares a voltage fed to the terminal CH2 with a threshold voltage to output the result of the comparison. If the voltage fed to the terminal CH2 is equal to or higher than the threshold voltage, the output signal of the comparator 42 is at low level (a level indicating a normal state) and, if the voltage fed to the terminal CH2 is lower than the threshold voltage, the output signal of the comparator 42 is at high level (a level indicating a ground fault at the terminal CH2). The threshold voltage used in the comparator 42 shifts between a second threshold voltage $V_{TH2}$ and a third threshold voltage $V_{TH3}$ in accordance with the level of the output signal of the comparator 42. The output signal of the comparator 42 is transmitted to the control logic circuit 3.

The LED switching circuit 4 includes a comparator 43 for sensing a ground fault at the terminal CH4. The comparator 43 is a hysteresis comparator and compares a voltage fed to the terminal CH4 with a threshold voltage to output the result of the comparison. If the voltage fed to the terminal CH4 is equal to or higher than the threshold voltage, the output signal of the comparator 43 is at low level (a level indicating a normal state) and, if the voltage fed to the terminal CH4 is lower than the threshold voltage, the output signal of the comparator 43 is at high level (a level indicating a ground fault at the terminal CH4). The threshold voltage used in the comparator 43 shifts between a fourth threshold voltage $V_{TH4}$ and a fifth threshold voltage $V_{TH5}$ in accordance with the level of the output signal of the comparator 43. The output signal of the comparator 43 is transmitted to the control logic circuit 3.

The LED switching circuit 4 includes a comparator 44 for sensing a ground fault at the terminal CH6. The comparator 44 is a hysteresis comparator and compares a voltage fed to the terminal CH6 with a threshold voltage to output the result of the comparison. If the voltage fed to the terminal CH6 is equal to or higher than the threshold voltage, the output signal of the comparator 44 is at low level (a level indicating a normal state) and, if the voltage fed to the terminal CH6 is lower than the threshold voltage, the output signal of the comparator 44 is at high level (a level indicating a ground fault at the terminal CH6). The threshold voltage used in the comparator 44 shifts between a sixth threshold voltage $V_{TH6}$ and a seventh threshold voltage $V_{TH7}$ in accordance with the level of the output signal of the comparator 44. The output signal of the comparator 44 is transmitted to the control logic circuit 3.

The LED switching circuit 4 includes a comparator 45 for sensing a ground fault at the terminal CH8. The comparator 45 is a hysteresis comparator and compares a voltage fed to the terminal CH8 with a threshold voltage to output the result of the comparison. If the voltage fed to the terminal CH8 is equal to or higher than the threshold voltage, the output signal of the comparator 45 is at low level (a level indicating a normal state) and, if the voltage fed to the terminal CH8 is lower than the threshold voltage, the output signal of the comparator 45 is at high level (a level indicating a ground fault at the terminal CH8). The threshold voltage used in the comparator 45 shifts between an eighth threshold voltage $V_{TH8}$ and a ninth threshold voltage $V_{TH9}$ in accordance with the level of the output signal of the comparator 45. The output signal of the comparator 45 is transmitted to the control logic circuit 3.

In the embodiment, the output signals of the comparators 41 to 45 are transmitted to the control logic circuit 3; instead, the OR of the output signals of the comparators 41 to 45 may be transmitted to the control logic circuit 3. If the OR of the output signals from the comparators 41 to 45 is at high level, at least one of the terminals CH0, C112, CH4, CH6, and CH8 is short-circuited to ground. In the embodiment, the comparators 41 to 45 constitute a ground fault detector; instead, for example, only the comparator 41 may be provided or, contrariwise, a comparator or the like for sensing a ground fault at the terminal CH1 may be added.

When a ground fault is detected by the ground fault detector described above, the control logic circuit 3 operates as a protector that suspends supplying current to the light emitting diodes Z0 to Z7. For example, when a ground fault is detected by the ground fault detector, the control logic circuit 3 controls the boosting drive circuit 12 so as to stop the operation of the DC-DC converter described above. In this way, when a ground fault occurs, it is possible to prevent a current from continuing to pass through the PMOS transistor M2 and cause loss in the PMOS transistor M2.

The LED switching circuit 4 includes an open detection circuit DETm that detects an open fault in the light emitting diode Zm. The open detection circuit DETm detects an open fault in the light emitting diode Zm if, when the switch SWm is off, the voltage across the light emitting diode Zm is higher than a predetermined value (a value slightly higher than the forward voltage across the light emitting diode Zm). Here, m is any integer of zero or more but seven or less.

The results of detection by the open detection circuits DET0 to DET7 are transmitted to the control logic circuit 3. When an open fault in a light emitting diode is detected by at least one of the open detection circuits DET0 to DET7, the control logic circuit 3 turns on, of the switches SW0 to SW7, the switch connected in parallel with the light emitting diode that has been detected as open to form a bypass route bypassing the light emitting diode that has been detected as open. In this way, even if part of the light emitting diodes Z0 to Z7 become open, it is possible to prevent all the light emitting diodes Z0 to Z7 from being extinguished.

However, the bypass route formed as a result of detection of an open fault may cause an overcurrent in the LED current $I_{LED}$ due to the decreased number of light emitting diodes Z0 to Z7 that are lit. Thus, at the same time as detection of an open fault by at least one of the open detection circuits DET0 to DET7, the control logic circuit 3 increases the resistance value of the PMOS transistor M2. In this way, it is possible to suppress an increase in the LED current $I_{LED}$ resulting from detection of an open fault. From the perspective of forming a bypass route as soon as possible on detection of an open fault, in the embodiment, instead of a bypass route being formed after an increase in the resistance value of the PMOS transistor M2, formation of a bypass route is started at the same time as an increase in the resistance value of the PMOS transistor M2 is started. However, as in the circuit example shown in FIG. 1, in a configuration where the output voltage $V_{OUT}$ of the DC-DC converter described above takes time to increase after part of the light emitting diodes Z0 to Z7 become open due to slow response in the DC-DC converter, on detection of an open fault in part of the light emitting diodes Z0 to Z7, it is possible to increase the resistance value of the PMOS transistor M2 first and then form a bypass route.

<Applications>

Figure 6:
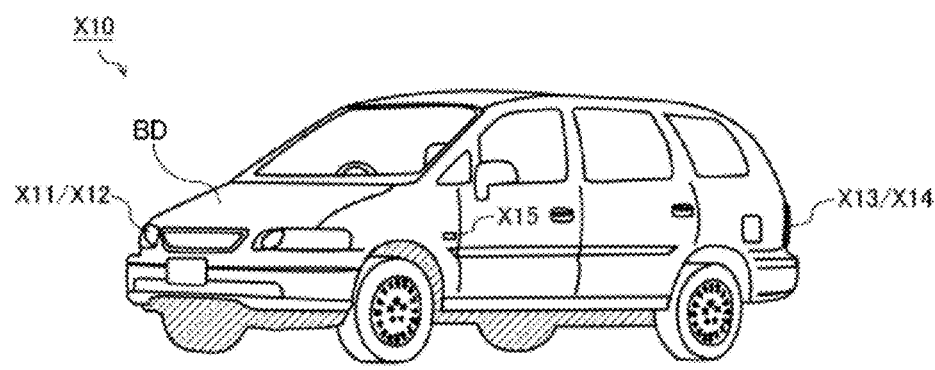
FIG. 6 is an exterior view (front view) of a vehicle mounted with a light emitting device.
Figure 7:
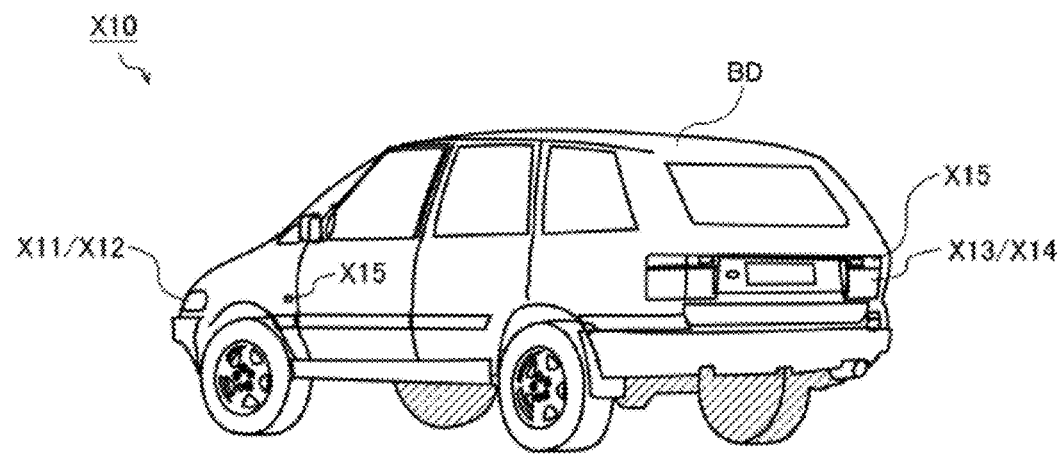
FIG. 7 is an exterior view (rear view) of the vehicle mounted with the light emitting device.

The light emitting device described above can be suitably used, for example, as shown in FIGS. 6 and 7, as a headlight (including a high beam, a low beam, a position lamp, a fog lamp, etc. as necessary) X11 of a vehicle X10, a light source for a daytime running lamp (DRL) X12, a tail lamp (including a position lamp, a backup lamp, etc. as necessary) X13, a brake lamp X14, or a blinker lamp X15. The vehicle X10 has a body DB.

Figure 8:
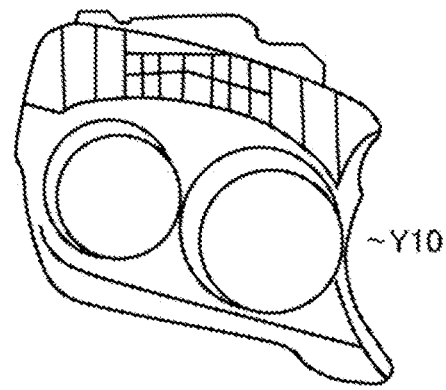
FIG. 8 is an exterior view of an LED headlight module.
Figure 9:
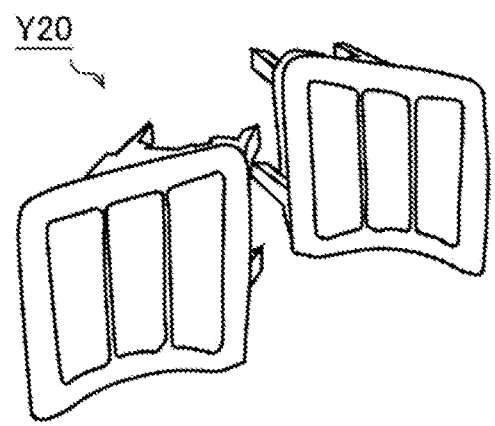
FIG. 9 is an exterior view of an LED blinker lamp module.
Figure 10:
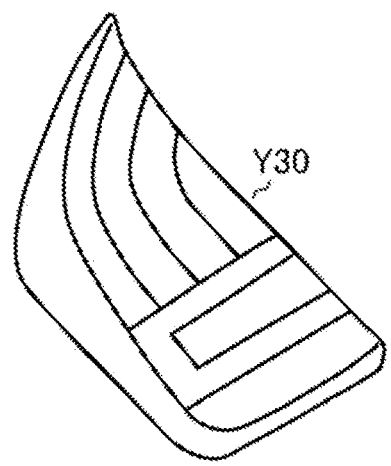
FIG. 10 is an exterior view of an LED rear lamp module.

The light emitting devices described above may be provided as a module (such as an LED headlight module Y10 in FIG. 8, an LED blinker lamp module Y20 in FIG. 9, and an LED rear lamp module Y30 in FIG. 10). The light emitting device may be provided in the form of a driving device having a function of controlling the number of light emitting elements to be lit, as a semi-product with the light emitting diodes, the externally fitted components of the light emitting element driving IC, and the like omitted from the light emitting device described above.

<Others>

The embodiment disclosed herein should be considered to be in every aspect illustrative and not restrictive, and the technical scope of the present invention is defined not by the description of embodiments given above but by the scope of the appended claims and should be understood to encompass any modifications within a sense and scope equivalent to the claims.

While the above embodiment deals with, as an example, a configuration using light emitting diodes as light emitting elements, this is not meant to limit how the present invention is to be implemented. For example, it is possible to use organic EL (electroluminescence) elements as light emitting elements.

While the above embodiment deals with, as an example, a configuration using PMOS transistors as variable resistors, this is not meant to limit how the present invention is to be implemented. For example, it is also possible to use any active elements other than PMOS transistors.

Figure 11:
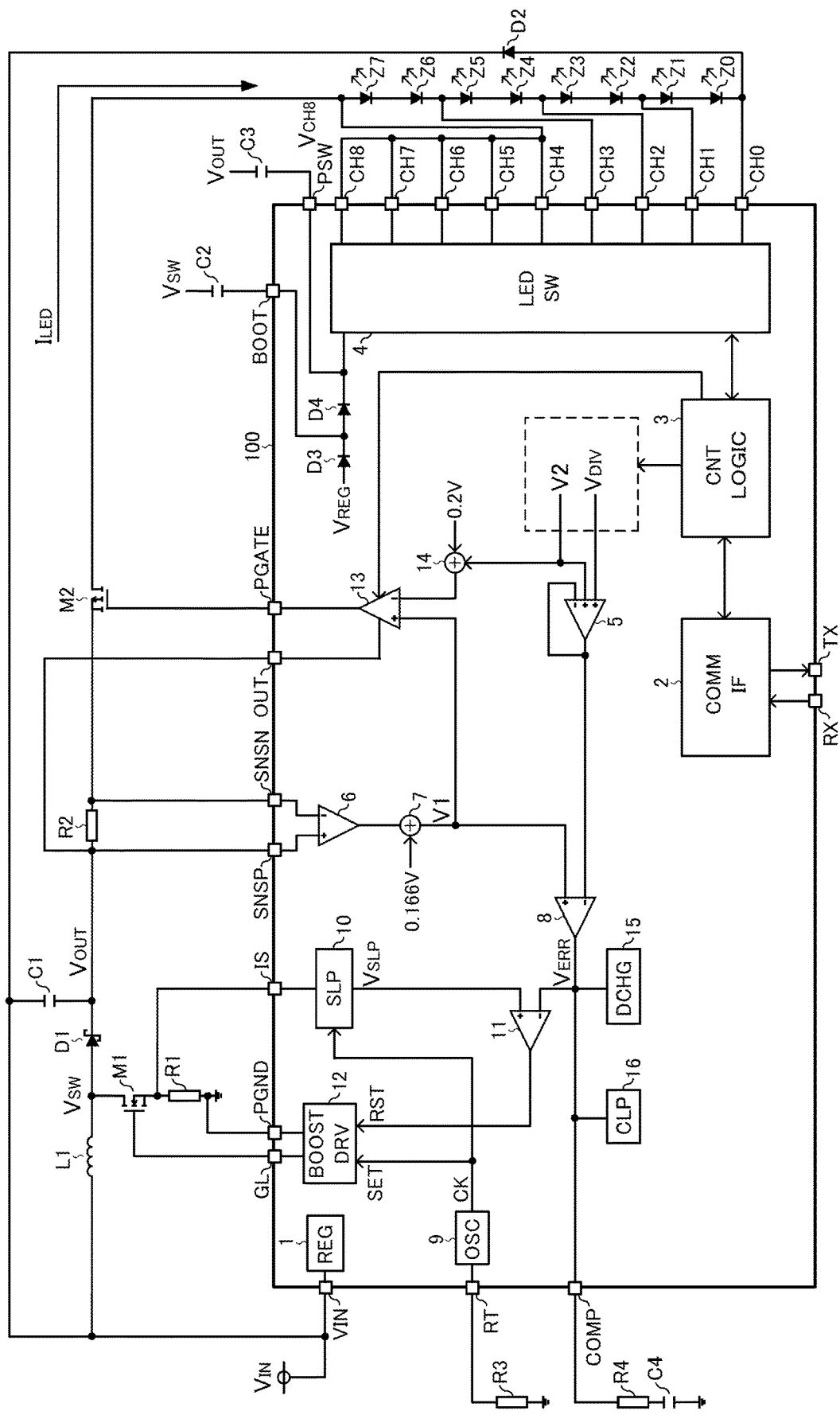
FIG. 11 is a diagram showing a modified example of the light emitting device.

While, in the above embodiment, a single light emitting diode is connected between the terminals CH(m+1) and CHm, a plurality of light emitting diodes may be connected between the terminals CH(k+1) and CHk (k is any is any integer of zero or more but seven or less). When a plurality of light emitting diodes are connected between the terminals CH(k+1) and CHk, they are handled as a group so that switching between lighting and extinction is performed for each of such groups. Also, it is necessary to control the voltage VCH8 fed to the terminal CH8 so that it will not exceed a rated value. FIG. 11 shows an example of a configuration where a plurality of light emitting diodes are connected between the terminals CH(k+1) and CHk. In the modified example shown in FIG. 11, two light emitting diodes are connected between the terminals CH(k+1) and CM, where k=0, 1, 2, and 3.

While, in the embodiment described above, nine terminals CH0 to CH8 can be connected to the light emitting diodes, the number of terminals that can be connected to the light emitting diodes is not limited to nine; it may be any number of two or more other than nine.

While the embodiment described above deals with a configuration where a light emitting device includes a single light emitting element driving IC 100, it is also possible to configure a part corresponding to the light emitting element driving IC 100 with a plurality of ICs. For example, a part corresponding to the communication interface 2, the control logic circuit 3, and the LED switching circuit 4 may be configured as an IC independent from the light emitting element driving IC 100.

According to one aspect of what is disclosed herein, a semiconductor integrated circuit for driving a light emitting element forms at least part of a light emitting element driving device configured to change the number of light emitting elements that are lit among a plurality of light emitting elements connected in series. The semiconductor integrated circuit includes a variable resistor controller configured to increase the resistance value of a variable resistor connected in series with the plurality of light emitting elements immediately before, or at the same time as, the time point at which the number of light emitting elements that are lit is reduced (a first configuration).

In the semiconductor integrated circuit according to the first configuration described above, preferably, the light emitting element driving device includes a DC-DC converter that converts an input voltage to an output voltage and a switching controller that controls a switching element in the DC-DC converter based on an error voltage output from an error amplifier that amplifies the difference between a first voltage based on an output current of the DC-DC converter and a second voltage corresponding to a target current. The light emitting element driving device may be configured to feed the output current of the DC-DC converter to, of the plurality of light emitting elements, the light emitting elements that are lit. The semiconductor integrated circuit may include a discharger configured to draw a current from the output terminal of the error amplifier when the variable resistor controller is keeping the resistance value of the variable resistor increased compared to during steady operation (a second configuration).

The semiconductor integrated circuit according to the second configuration described above, preferably, further includes a clamping element that clamps the lower limit of the error voltage (a third configuration).

The semiconductor integrated circuit according to the second or third configuration described above, preferably, further includes an offset processor configured to offset at least one of the first and second voltages. The variable resistor controller may be configured to adjust the resistance value of the variable resistor based on the difference between the first and second voltages with the at least one of the first and second voltages offset by the offset processor (a fourth configuration).

The semiconductor integrated circuit according to any of the first to fourth configurations described above, preferably, further includes an adjuster configured to change the number of light emitting elements that are lit. The adjuster may be configured to have a mode in which the timings of switching from lighting to extinction are shifted among the plurality of light emitting elements (a fifth configuration).

The semiconductor integrated circuit according to any of the first to fifth configurations described above, preferably, further includes a ground fault detector configured to detect a ground fault at least at one point in the series circuit of the plurality of light emitting elements and a protector configured to, when a ground fault is detected by the ground fault detector, suspend supplying current to the plurality of light emitting elements (a sixth configuration).

The semiconductor integrated circuit according to any of the first to sixth configurations described above, preferably, further includes an open detector configured to detect an open fault for each of a plurality of groups of light emitting elements among the plurality of light emitting elements and a bypass part configured to form a bypass route that bypasses, of the plurality of light emitting elements, the light emitting element in which the open fault has been detected by the open detector. The variable resistor controller may be configured to increase the resistance value of the variable resistor at the same time as the open fault is detected by the open detector (a seventh configuration).

According to another aspect of what is disclosed herein, a light emitting element driving device includes an adjuster configured to change the number of light emitting elements that are lit among a plurality of light emitting elements connected in series and a variable resistor controller configured to increase the resistance value of a variable resistor connected in series with the plurality of light emitting elements immediately before, or at the same time as, the time point at which the number of light emitting elements that are lit is reduced (an eighth configuration).

According to yet another aspect of what is disclosed herein, a light emitting device includes the light emitting element driving device according to the eighth configuration described above and the plurality of light emitting elements (a ninth configuration).

According to still another aspect of what is disclosed herein, a vehicle includes the light emitting device according to the ninth configuration described above (a tenth configuration).

LIST OF REFERENCE SIGNS 1 constant voltage circuit
2 communication interface
3 control logic circuit
4 LED switching circuit
5, 6, 13 operational amplifier
7, 14 adder
8 error amplifier
9 oscillator
10 slope circuit.
11 comparator
12 boosting drive circuit
15 discharge circuit
16 clamping element
100 light emitting element driving IC
BOOT, CH0 to CH8, COMP, GL, IS, PGATE, POND, PSW, RT, RX, SNSN, SNSP, TX, VIN terminal
C1 output capacitor
C2 to C4 capacitor
L1 coil
M1 NMOS transistor
M2 PMOS transistor
100 light emitting element driving IC
SW0 to SW7 switch
X10 vehicle
X11 headlight
X12 daytime running lamp
X13 tail lamp
X14 break lamp
X15 blinker lamp
Z0 to Z7 light emitting diode

The invention claimed is:

1. A semiconductor integrated circuit for driving a light emitting element, comprising:
a variable resistor controller configured to increase a resistance value of a variable resistor connected in series with a plurality of light emitting elements connected in series immediately before, or at the same time as, a time point at which a number of light emitting elements that are lit among the plurality of light emitting elements is reduced; and
a discharger configured to draw a current from an output terminal of an error amplifier when the variable resistor controller is keeping the resistance value of the variable resistor increased compared to during steady operation,
wherein
a current based on an error voltage output from the error amplifier is fed to the light emitting elements that are lit among the plurality of light emitting elements.

2. The semiconductor integrated circuit according to claim 1,
wherein
an output current of a DC-DC converter that converts an input voltage to an output voltage is fed to the light emitting elements that are lit among the plurality of light emitting elements,
the error amplifier is configured to amplify a difference between a first voltage based on the output current of the DC-DC converter and a second voltage corresponding to a target current, and a switching element in the DC-DC converter is configured to be controlled based on the error voltage.

3. The semiconductor integrated circuit according to claim 2, further comprising a clamping element that clamps a lower limit of the error voltage.

4. The semiconductor integrated circuit according to claim 2, further comprising an offset processor configured to offset at least one of the first and second voltages,
wherein
the variable resistor controller is configured to adjust the resistance value of the variable resistor based on a difference between the first and second voltages with the at least one of the first and second voltages offset by the offset processor.

5. The semiconductor integrated circuit according to claim 1, further comprising an adjuster configured to change the number of light emitting elements that are lit,
wherein
the adjuster is configured to have a mode in which timings of switching from lighting to extinction are shifted among the plurality of light emitting elements.

6. The semiconductor integrated circuit according to claim 1, further comprising:
a ground fault detector configured to detect a ground fault at least at one point in a series circuit of the plurality of light emitting elements; and
a protector configured to, when a ground fault is detected by the ground fault detector, suspend supplying current to the plurality of light emitting elements.

7. The semiconductor integrated circuit according to claim 1, further comprising:
an open detector configured to detect an open fault for each of a plurality of groups of light emitting elements among the plurality of light emitting elements; and
a bypass part configured to form a bypass route that bypasses, of the plurality of light emitting elements, the light emitting element in which the open fault has been detected by the open detector,
wherein
the variable resistor controller is configured to increase the resistance value of the variable resistor at the same time as the open fault is detected by the open detector.

8. A light emitting element driving device, comprising:
an adjuster configured to change a number of light emitting elements that are lit among a plurality of light emitting elements connected in series;
a variable resistor controller configured to increase a resistance value of a variable resistor connected in series with the plurality of light emitting elements immediately before, or at the same time as, a time point at which the number of light emitting elements that are lit is reduced; and
a discharger configured to draw a current from an output terminal of an error amplifier when the variable resistor controller is keeping the resistance value of the variable resistor increased compared to during steady operation,
wherein
a current based on an error voltage output from the error amplifier is fed to the light emitting elements that are lit among the plurality of light emitting elements.

9. A light emitting device comprising:
the light emitting element driving device according to claim 8, and
the plurality of light emitting elements.

10. A vehicle comprising:
a body; and
a lamp provided in the body,
wherein
the lamp is the light emitting device according to claim 9.

* * * * *